United States Patent [19]

Yanosy, Jr. et al.

[11] Patent Number: 4,677,611
[45] Date of Patent: Jun. 30, 1987

[54] APPARATUS AND METHOD FOR EXECUTING COMMUNICATION PROTOCOL CONVERSIONS

[75] Inventors: John A. Yanosy, Jr., Stratford; Anthony J. Dennett, Shelton; John P. Hufnagel, Southbury, all of Conn.

[73] Assignee: ITT Corporation, New York, N.Y.

[21] Appl. No.: 705,461

[22] Filed: Feb. 25, 1985

[51] Int. Cl.⁴ .................... H04J 3/02; H04J 3/16
[52] U.S. Cl. .................................. 370/85; 370/89; 340/825.5
[58] Field of Search ............ 370/85, 110.1, 58, 88, 370/89; 340/825.5

[56] References Cited

U.S. PATENT DOCUMENTS

| | | | |
|---|---|---|---|
| 3,796,835 | 3/1974 | Closs et al. | 370/89 |
| 4,512,016 | 4/1985 | Fulcomer, Jr. et al. | 370/110.1 |
| 4,535,448 | 8/1985 | Baxter et al. | 370/85 |
| 4,568,930 | 2/1986 | Livingston et al. | 370/85 |

Primary Examiner—Douglas W. Olms
Assistant Examiner—Frank M. Scutch, III
Attorney, Agent, or Firm—Robert A. Hays; Peter C. Van Der Sluys

[57] ABSTRACT

An apparatus for efficiently executing communication protocol conversions includes a plurality of peripheral interface devices each executing only a single communication protocol conversion whereby the processing capacity required is reduced for each such device. In addition, a single network wide uniform communication protocol is incorporated within each apparatus.

20 Claims, 6 Drawing Figures

APPARATUS AND METHOD FOR EXECUTING COMMUNICATION PROTOCOL CONVERSIONS

CROSS-RFERENCE TO RELATED APPLICATIONS:

This application is related to one, or more, of the following U.S. patent applications: Ser. Nos. 670,682; 670,701 both filed on Nov. 13, 1984. Ser. Nos. 705,456; 705,457; 705,458; 705,459; 705,460; 705,462; 705,463; 705,465; 705,464 all filed on even date herewith. All of the above applications are assigned to the assignee hereof.

BACKGROUND OF THE INVENTION

The present invention generally relates to an apparatus and method for executing communication protocol conversions and, in particular, relates to such an apparatus and method whereby conversion from an external protocol to a uniform network protocol is efficiently executed.

In an effort to simplify what is frequently a rather complex design problem, most telecommunication systems are organized via the use of layers, or levels. Each layer is independently structured based on the services and functions provided by the adjacent layers. The number of layers in any given system or subsystem depends on the specific functions and services to be provided thereby. In addition, each layer is designed to communicate with adjacent layers via an interface. Generally, each layer provides certain clearly defined services or functions and, consequently, can be effectively designed fairly independent from the adjacent functions or services. Hence, the detailed implementation of the defined services and functions of any given layer are more simply designed. As one example, the first layer, or level, can be defined as the actual, i.e., physical, communication medium of the system, such as a coaxial cable, a printed circuit strip line, a microwave transmission network, or the like. In actually, most telecommunication systems include more than one of the above-mentioned communication media.

Each layer is usually provided with a unique set of rules that regulate and control data communication within that layer and define the parameters for all layers interfacing therewith. In fact, any particular layer may include a plurality of nested sets of communication rules whereby, for example, a predetermined one of different data communication medium is selected according to the data destination and the appropriate set of rules are enforced. In any data communication device, whether a communication terminal or a worldwide communication network, the functions and services of each layer, as well as the transfer of data between adjacent layers are frequently regulated, i.e. defined, by the operating system software. By definition, the totality of the rules and regulations governing communication with such a device, regardless of the number of internal or nested layers provided therewithin, is known as the communication protocol of that device.

However, in order for two devices, such as two different terminals, having different communication protocols to communicate with each other, a rather complex protocol conversion must be performed. Generally, in a communication network, this conversion can be executed in a number of different ways. In one conventional technique, a centralized processor having all necessary protocols stored therein, i.e. the communication protocol for each different type device, is included in the network. A centralized processor technique is frequently employed because of the magnitude of the memory required for storing all possible communication protocol conversion information for all protocols being used in any given network. In such an approach, data from a source device is first transferred to the centralized processor wherein the communication protocol conversion is executed. Thereafter, the data is transferred to the destination device having a communication protocol compatible therewith. However, as a consequence, all data entering such a network must pass through the centralized processor for executing the necessary communication protocol conversions and the transference of the data to the addressee. The data path through the central processor is thus traversed by all data entering the network, even if the transmitting and receiving peripherals have identical communication protocols. Understandably, this is inefficient, both because it is time consuming when no communication protocol conversion is necessary but also because the potential for data transfer errors increases as the network path length and transmit time therealong increases.

The most prevalent alternative scheme of executing communication protocol conversions between external peripheral devices operating under different protocols requires each subsystem of a network to execute the requisite communication protocol conversions. In such a scheme, each subsystem is provided with a dedicated subsystem processor containing all communication protocol conversion information for the protocols acceptable to the system. For example, if four different communication protocols are predesigned into a data communication network, each subsystem interconnected thereto must include a processor having the capacity, both in memory and actual processing capability, to convert between any combination of any two of those four protocols. Such conversions, of course, are in addition to the usual communication protocol conversion to the network protocol. In addition, similar to the central processing technique discussed above, all data entering, from either a peripheral or the network, a subsystem must pass through the subsystem processor. Thus, this technique is inefficient since the subsystem processor is a source of bottlenecking.

In addition to the above-mentioned drawbacks, the greatest and most expensive difficulty of either technique is the reprogramming required if a peripheral with yet another protocol is to be interconnected with the network. In fact, the expense of such reprogramming is often prohibitive, thus limiting such networks to interfacing with only specific types of peripherals. It is for just this reason that many data communication device manufactures emphasize the compatibility among their own products.

From the above it is apparent that an appparatus and a method for executing communication protocol conversions between different communication protocols associated with external devices is highly desirable in light of the plethora of different data communication devices presently available and anticipated for providing data communication services to a burgeoning market.

SUMMARY OF THE INVENTION

Accordingly, it is one object of the present invention to provide an apparatus and method for executing communication protocol conversions between different communication protocols.

This object is accomplished, at least in part, by an apparatus having a plurality of peripheral interface devices, each including means for executing only a single communication protocol conversion.

Other objects and advantages will become apparent to those skilled in the art from the following detailed description read in conjunction with the appended claims and the drawings attached hereto.

DETAILED DESCRIPTION OF THE INVENTION

Figure 1:
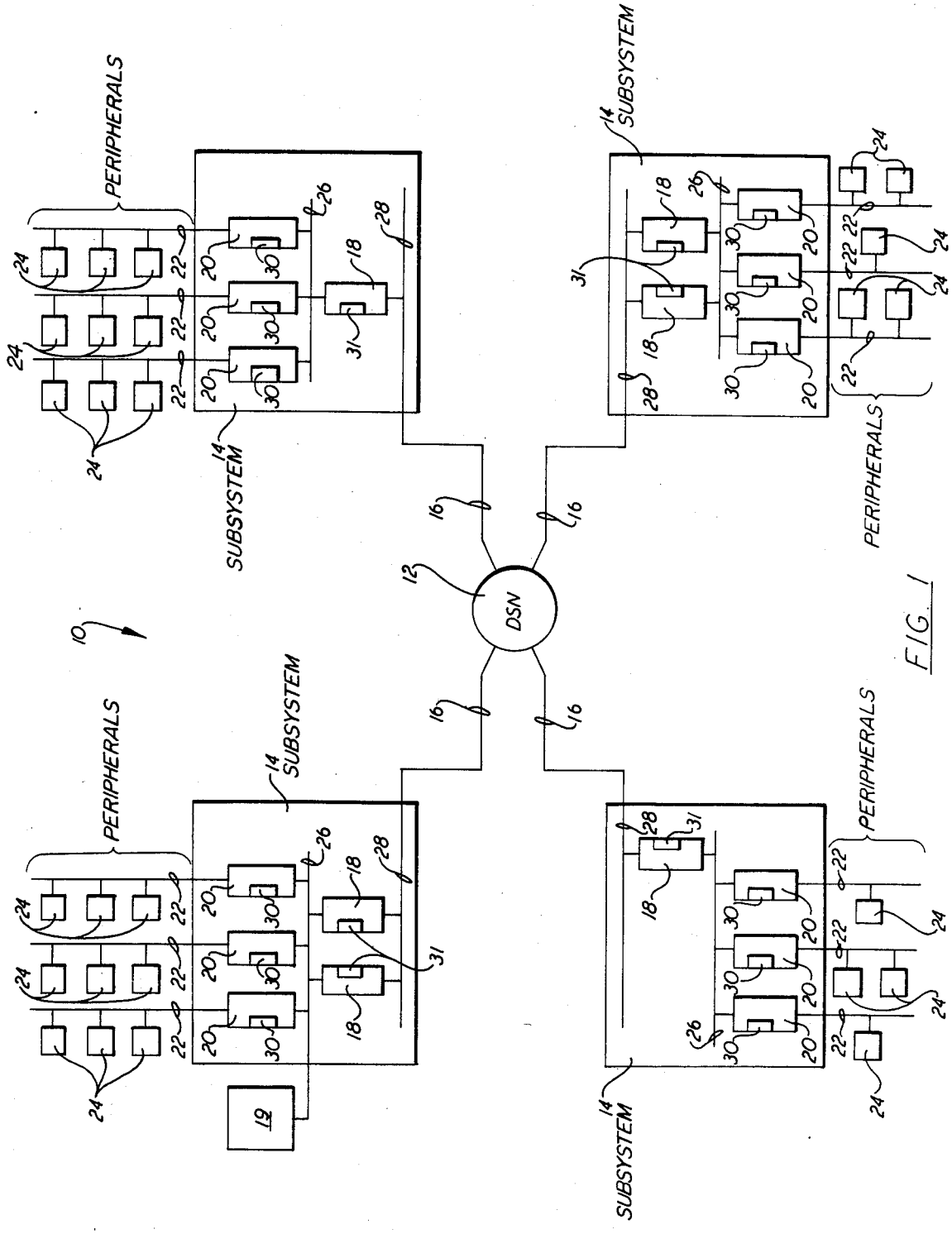
FIG. 1 is a block diagram of a communication network embodying the principles of the present invention.

An apparatus, generally indicated at 10 and embodying the principles of the present invention, includes for example a digital switching network 12, although other networking techniques may also be employed, having a plurality of subsystems 14 interconnected thereto via a plurality of communication links 16. Each subsystems 14 includes at least one network interface device 18, at least one peripheral interface device 20 and means 22 for establishing communication between each peripheral interface device 20 and a plurality of peripherals 24. In addition, each subsystem 14 includes means 26 for establishing communication among the peripheral interface devices 20 therein; the means 26 also establishing communication between the peripheral interface devices 20 and all network interface device 18 within the subsystem 14. Further, each subsystem 14 includes means 28 for establishing communication between any network interface device 18 therewithin and the communication link 16 thereto. Preferably, one subsystem 14 further includes a means 19 for executing unusual, or higher order or gateway protocol conversions. As shown in FIG. 1 such a means 19 can be located external to a subsystem 14 and be accessed by, for example, other subsystems 14 via the network 12.

Each peripheral interface device 20 includes a means 30 for bidirectionally executing only a single communication protocol conversion between a preselected external communication protocol and a communication protocol that is uniform for all peripheral interface devices 20, all network interface devices 18 and the switching network 12. That is, each peripheral interface device 20 communicates, via the means 22 associated therewith, with only those peripherals 24 that are compatible with the preselected external communication protocol thereof. Each network interface device 18 includes, as more fully discussed below, means 31 for formatting information transported across the device 18 into both the intrasubsystem or the intersubsystem communication format of the information network protocol.

As used herein, the phrase "communication protocol conversion", or the idiomatic equivalents thereof, refers only to the conversion between communication protocols of different data communication devices, networks, systems or the like. The word "data" as used herein is intended to encompass any digitally encoded information.

In one particular embodiment, the digital switching network 12 is adapted to set up and tear down communication paths between subsystems 14 without affecting the data communicated. One such digital switching network 12, for example, is the ITT SYSTEM 12 digital exchange. In such an embodiment, the digital switching network 12 routes all traffic therethrough according to a uniform command and control instruction set that is independent of any actual data being transferred. Consequently, the use of such a digital switching network 12 avoids unnecessary communication protocol converesions because the network elements merely set up and tear down paths without manipulating the data being transferred. In such a digital switching network 12 the commands and controls can be provided as packetized information both in front and in back of the actual data to be communicated.

Each subsystem 14 is adapted to provide intercommunication facilitates among a substantial plurality of peripherals 24 as well as with the digital switching network 12. In the preferred embodiment, the peripheral interface devices 20 and the network interface devices 18, at the very least throughout each subsystem 14 and, preferably, throughout the entire communication system, are substantially identical differing only in the assigned task. That is, the hardware, including the actual positioning of the components of any given peripheral interface device 20 is the same as any other peripheral interface device 20 and the same as any network interface device 18. The major difference more fully discussed below in reference to FIG. 1, among the peripheral interface devices 20 of each subsystem 14 insofar as the apparatus 10 is concerned, is the software provided to execute communication protocol conversion. One subsystem 14 particularly useful with the apparatus 10 is described and discussed in U.S. patent application Ser. No. 705,464 entitled "Communication Subsystem" filed on even date herewith and assigned to the assignee hereof. This patent application is deemed incorporated herein by reference.

As discussed in the above-referenced patent application such as subsystem 14 includes peripheral interface devices 20 as well as network interface devices 18. Each such device, 20 or 18, includes a data transport controller, indicated at 32 in FIG. 2, that is uniform throughout the subsystem 14. The data transport controller 32 regulates and controls the flow of data between the means 26 and; when used as a peripheral interface device 20, the means 22, or, when used as a network interface device 18, the means 28. One particular data transport controller 32 that is particularly compatible with the above-referenced subsystem 14 is described and discussed in U.S. patent application Ser. No. 705,457 entitled "Data Transport Control Apparatus" filed on even date herewith and assigned to the assignee hereof. This patent application is also deemed incorporated herein by reference.

Figure 2:
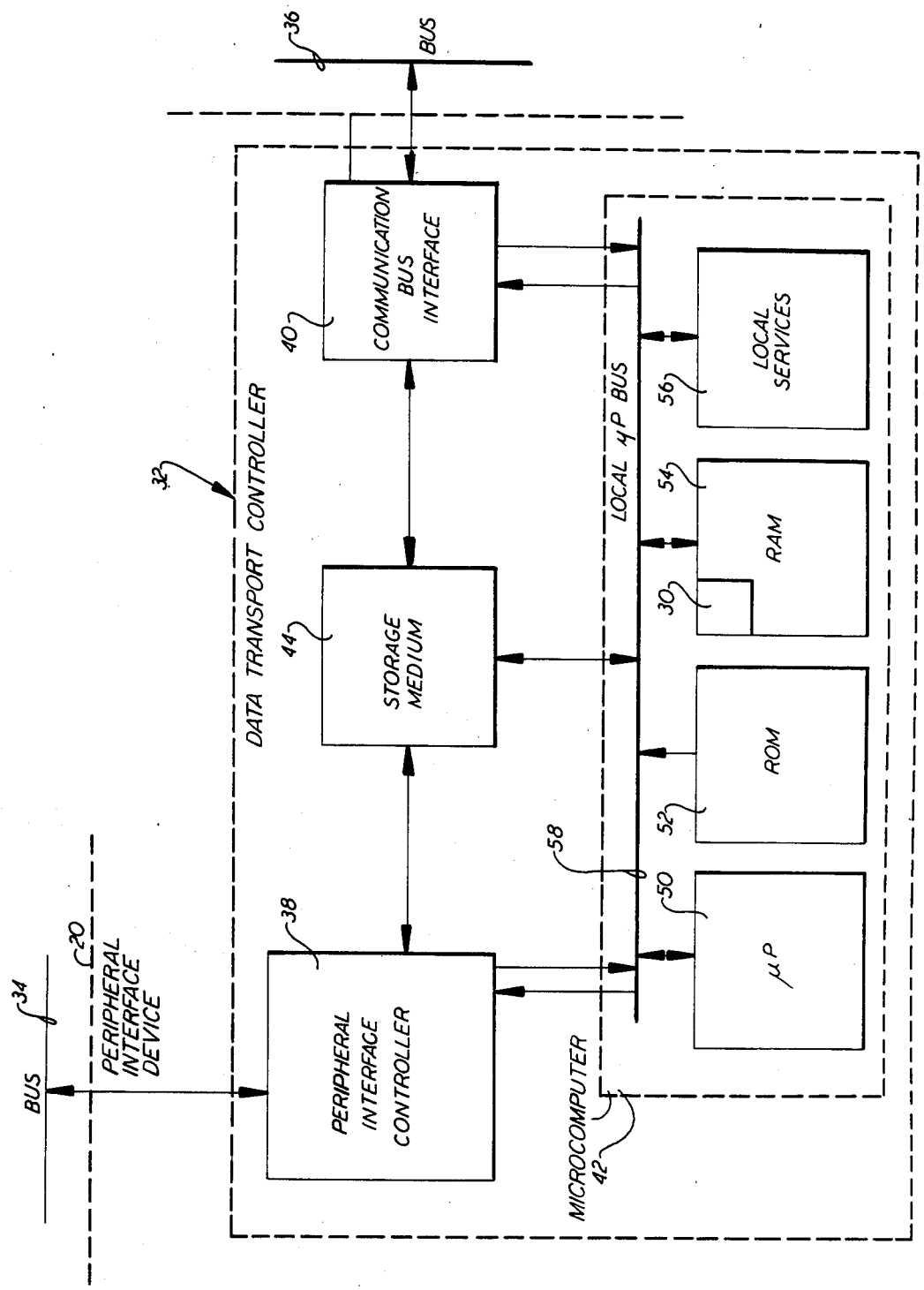
FIG. 2 is a more detailed block diagram of the peripheral interface device shown in FIGS. 1.

Referring to FIG. 2 there is shown a generalized block diagram of a peripheral interface device 20 interconnected between a high speed bus 34, the bus 34 being adapted to interface with a plurality of peripherals 24, and an intrasubsystem bus 36 via a data transport controller 32. The data transport controller 32 includes a peripheral interface controller 38, a communication bus interface 40, a microcomputer 42 and a storage medium 44. In the preferred embodiment, the peripheral interface controller 38 is adapted to service a plurality of peripherals 24 operating according to the same communication protocol. Such a peripheral interface controller 38 includes both a general peripheral control program and a device specific program adapted to allow intercommunication to each of various types of peripherals 24 according to the individual operating requirements thereof. One particular peripheral interface controller 38 specifically adapted to provide such services is fully described and discussed in U.S. patent application Ser. No. 705,458 entitled "Device Interface Controller" filed on even date herewith and assigned to the assignee hereof. This referenced application is deemed incorporated herein by reference.

Figure 3:
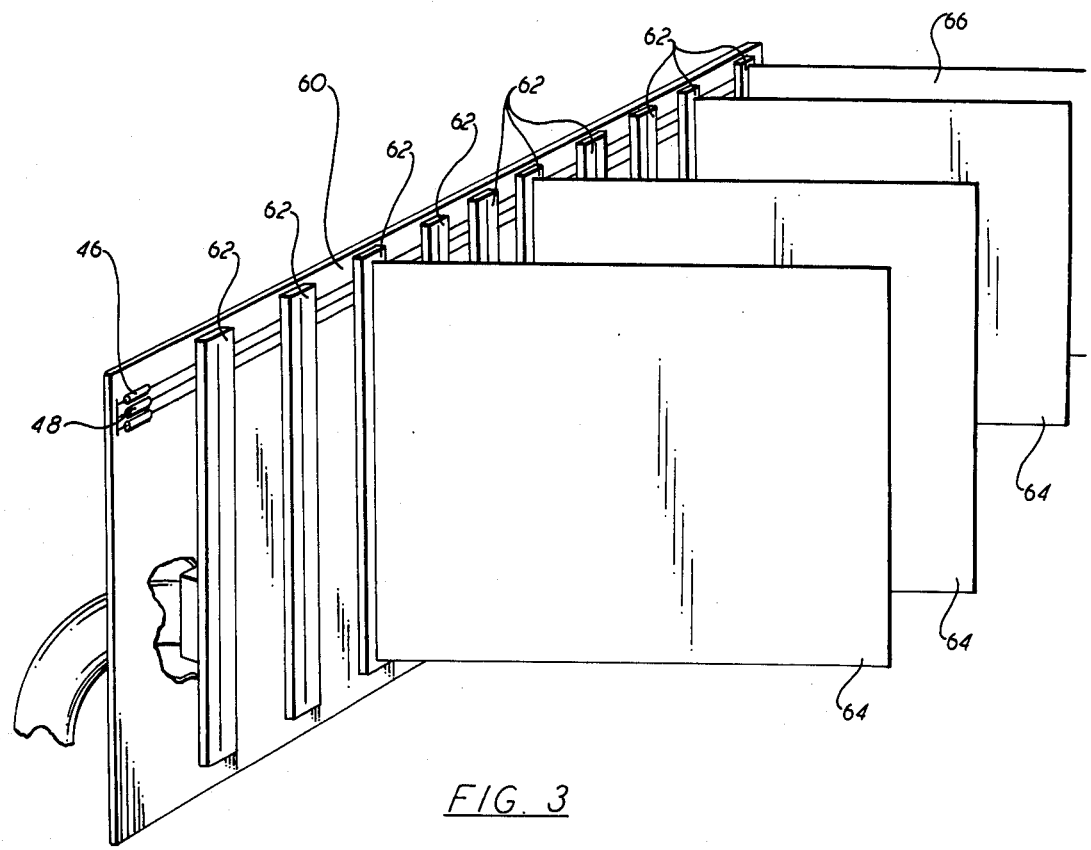
FIG. 3 is a perspective view of one hardware implementation of the apparatus shown in FIG. 1.

In the preferred embodiment, the communication bus interface 40 includes a masterless multiple access communication medium with collision detection having a first bus 46, shown more clearly in FIG. 3, for sustaining data transmissions therealong and a second bus 48, distinct from the first bus 46, and provided solely for collision detection.

Examples of such an interface 40 are described and discussed in U.S. patent application Ser. Nos. 670,682 and 670,701 both filed on Nov. 13, 1984 and assigned to the assignee hereof. These referenced applications are deemed incorporated herein by reference.

The microcomputer 42 includes a microprocessor 50, a read-only-memory (ROM) 52, a random-access-memory (RAM) 54 and a means 56 for providing local services, such as high level protocol conversions that are relatively infrequently required for, for example, providing gateway functions. The microprocessor 50, the ROM 52, the RAM 54 and the means 56 are interconnected via the local bus 58 of the microcomputer 42. As discussed in the above-referenced patent application Ser. No. 705,457 entitled "Data Transport Control Apparatus", the microcomputer 42 is directly connected to the peripheral interface controller 38 and the communication bus interface 40 only for the exchange of interrupt and channel attention signalling. Preferably, the microcomputer 42 is a high capacity microcomputer, such as the 80186 microprocessor device, manufactured and marketed by Intel Corp. of Santa Clara, California. Such a microcomputer 42 includes sufficient capacity to execute the requisite single protocol conversion and to regulate the data traffic thereacross. One apparatus and associated method useful for controlling data traffic through a subsystem 14 is described and discussed in U.S. patent application Ser. No. 705,465 entitled "Data Subsystem Traffic Control Apparatus and Method" filed on even date herewith and assigned to the assignee hereof. This application is deemed incorporated herein by reference.

As shown, the means 30 for bidirectionally executing a single communication protocol conversion is preferably stored in RAM 54. The actual program for executing such a communication protocol conversion is not germane to the present invention as many such programs, per se, are known. Further, the means 30 could be stored in ROM 52. However, by electing to store the means 30 in RAM 54 the peripheral interface device 20 can be available as a standard component for any subsystem 14 and the means 30 can be downloaded thereinto after the particular peripheral application is selected.

In one preferred implementation, shown in FIG. 3, a subsystem 14, designed according to the principles of the above-referenced U.S. patent application Ser. No. 705,464 entitled "Communication Subsystem", includes a printed circuit board mainframe 60, having means 62 for accepting a plurality of printed circuit boards therein. The printed circuit board mainframe 60 preferably includes the means 28 etched thereinto. Further, each peripheral interface device 20 and each network interface device 18 is self-contained on separate printed circuit boards, 64 and 66, respectively. Hence, in this embodiment, the subsystem 14 is substantially completely self-contained and is, for all intents and purposes, prewired to be modularly expanded. Thus, any peripheral 24 operating under a previously unavailable communication protocol can be accommodated simply by the insertion of a printed circuit board carrying a new peripheral interface device 20 having a means 30 dedicated to only that protocol. Consequently, each subsystem 14 and the entire apparatus 10 are easily expanded without reprogramming or redesigning the entire system. Naturally, depending upon the number of peripheral 24 having the same communication protocol to be connected, more than one peripheral interface device 20 can be provided for executing any specific communication protocol conversion.

Figure 4:
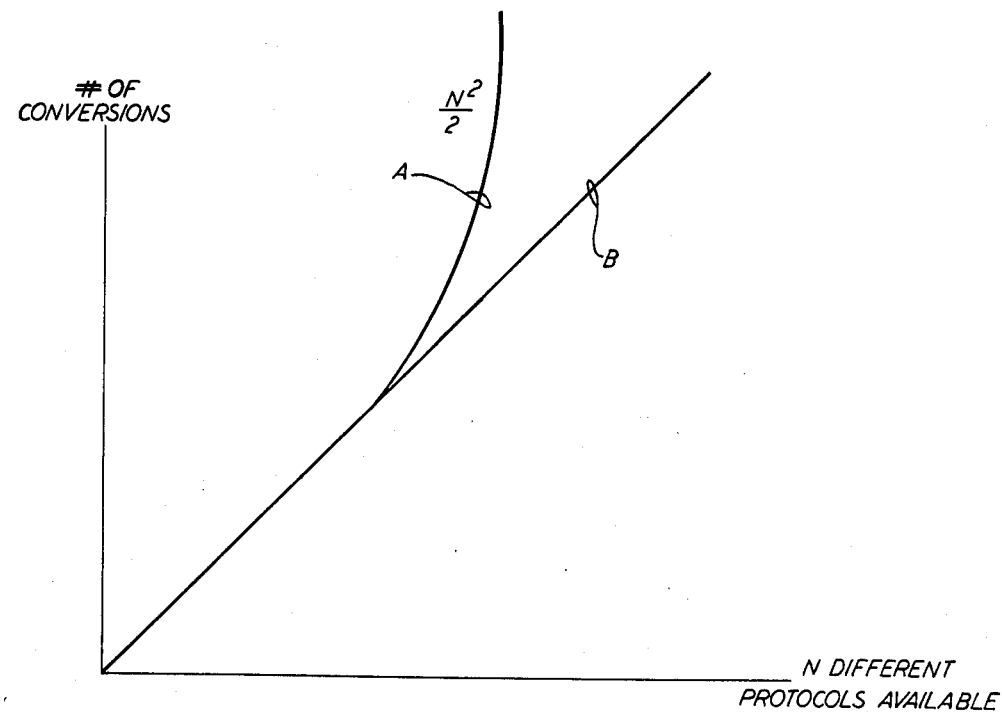
FIG. 4 is a graphic comparison relating system growth to the number of required communications protocol conversions in a communication network.

The fact that a plurality of peripheral interface devices 20 are provided in each subsystem 14 and that each peripheral interface device 20 is required to execute only one communication protocol conversion between a preselected external communication protocol and the uniform communication protocol reduces the number of communication protocol conversion programs stored within any subsystem 14. As a result, the apparatus 10 requires significantly less processing power and physical space, hence there is a significant reduction in both initial system costs and updating expenses. Further, because each peripheral interface device 20 is dedicated to executing only a single communication protocol conversion the transfer of data between the peripherals 24 intercommunicating via the apparatus 10 is faster since there is no time lost searching for the correct communication protocol conversion program. These advantages are apparent from the graph of FIG. 4.

Therein, the line A represents a centralized processor subsystem and line B represents the apparatus 10. The graph is a plot of the number of communication protocol conversion means 30 required for different numbers of communication protocols available, i.e. the number of different communication protocols that are compatible with the apparatus 10 discounting any unique, special or high level communication protocols handled by the means 56 of the microcomputer 42, or by the means 19.

As shown, the number of means 30 required by the centralized subsystem increases by approximately $N^2/2$ wherein N is the number of different external communication protocols available. Clearly, the centralized subsystem increase in the total number of means 30 required increases exponentially with the number of external communication protocols available to subscribers. However, as shown, the same increase in the apparatus 10 is a linear increase with the number of communication protocols available to subscribers thereto.

Before discussing the preferred method of executing communication protocol conversions it will be understood that for the present description, the particular functions and services assigned to the various layers of a communication protocol are generally based on the Reference Model of Open Systems Interconnection (OSI) as proposed by the International Standards Organization (ISO) although other formats, or models, can also be employed. Thus, for example, Layer 3 is a "Network Layer" and, inter alia, determines how data packets are routed; Layer 2 is a "Data Link Layer" and, inter alia, accepts a transmission and transforms it into a transmittable stream of bits; and Layer 1 is a "Physical Layer" and, inter alia, relates to the actual physical transmission path of a stream of bits over a communication link.

Throughout the following discussion of the preferred method the following abbreviations are used: EP is used to indicate an external protocol, such as that of a particular peripheral; NA is used to indicate the uniform network protocol; (BL #) is used to indicate the intrasubsystem nested portion of the uniform network protocol; (NL #) is used to designate the intersubsystem nested portion of the uniform network protocol; and (L #) is used to indicate the general protocol level.

Figure 5:
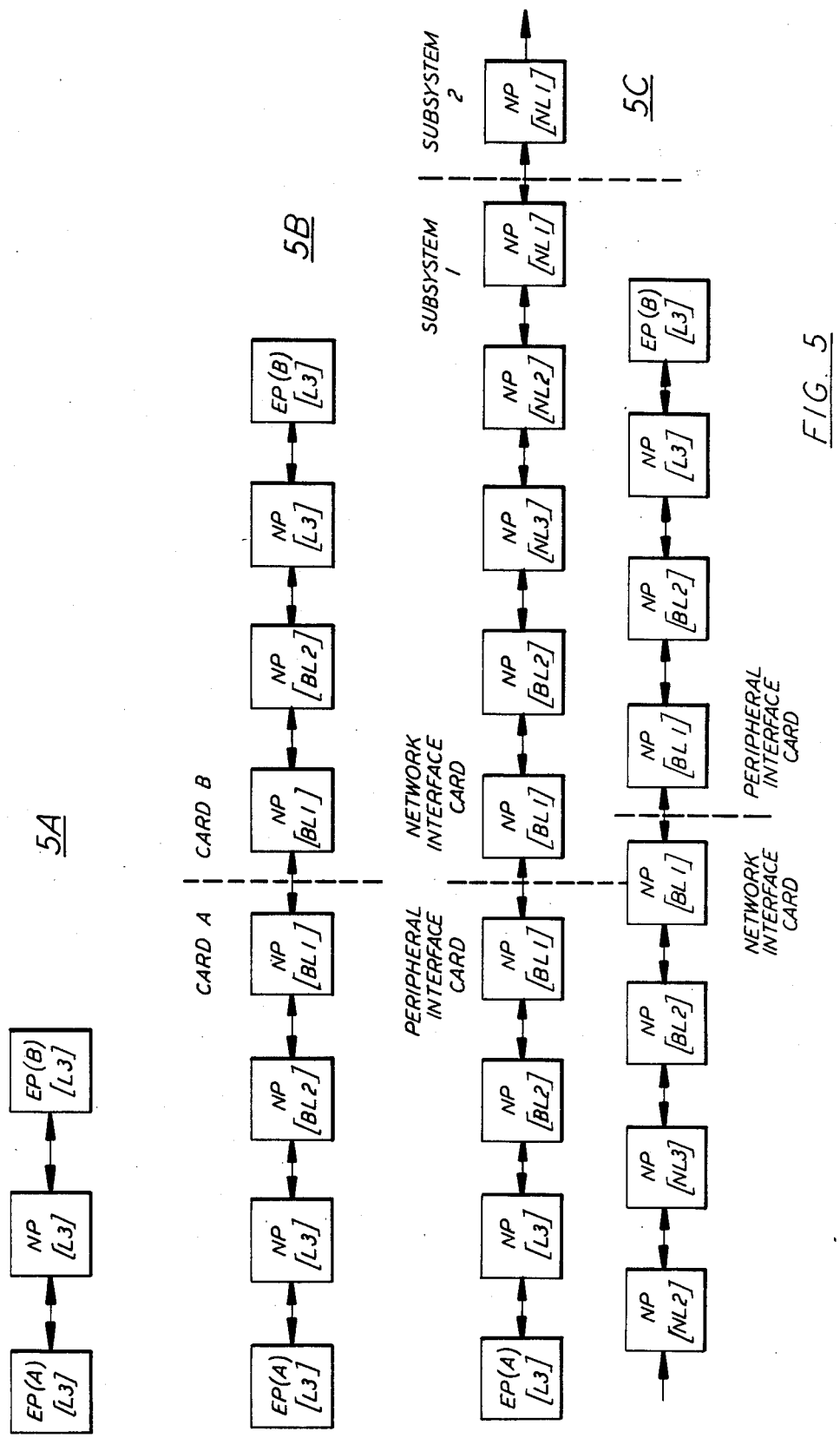
FIGS. 5A-5C are line diagrams of data paths within the network shown in FIG. 1.

As shown in FIG. 5A, data formatted at Level 3 [L3] entering any peripheral interface device 20 immediately undergoes a communication protocol conversion from the external protocol [EP (A)] of that peripheral 24 to the uniform network communication protocol [NP L3] via the means 30. The single protocol conversion effectively converts information related to the highest layer of the external protocol requiring data transport services to the format of Layer 3 of the uniform network protocol. Conversion at higher layers can be accomplished by the means 19 for executing extended protocol conversions. If the addressee of incoming data operates under the same communication protocol as the sender and is interconnected to the same peripheral interface device 20, the data is exchanged according to the Layer 3 format. That is, the data is received and delivered within the same peripheral interface device 20 and without exiting that device 20, in fact, such data is most frequently routed without exiting the card. More specifically, data transferred as described above does not traverse any subsystem or network central processor.

If, with reference now to FIG. 5B, however, the addressee is not directly interconnected to the same peripheral interface device 20 as the data sending peripheral, data is first transformed to the [NP L3] of the uniform network protocol and then exits the peripheral interface device 20 at the intrasubsystem Layer 2 and Layer 1, i.e. enveloped formats [BL 1 [BL 2 [NP L3] BL 2] BL 1], respectively, of the intranodal communication protocol by the means 26. Data exiting any peripheral interface device 20 to be transported across the subsystem 14 is conveyed, via the means 26 to the destination peripheral interface device 20 and reformatted in reverse steps, i.e. [NP [BL 1]] to [NP [BL 2]] to [NP L3] to [EP (B)].

The ability to provide such data packet communication service between external protocols is a direct consequence of requiring each peripheral interface device 20 to execute only a single communication protocol conversion between an external protocol [A] and the uniform network protocol [NP]. Conversely, if each peripheral interface device 20 were required to execute a plurality of communication protocol conversions, the memory and processing power necessary for providing the desired traffic flow control on each peripheral interface device 20 would become considerably more expensive and complex.

Referring now to FIG. 5C, when data is addressed to a peripheral 24 interconnected to a different subsystem 14 interconnected via the digital switching network 12 the data is passed through one of the network interface devices 18. For all intents and purposes the network interface devices 18 are identical. Further, each such network interface device 18 includes means 31 for reformatting data from the [NP [BL1]] and [NP/BL2] used for transporting data along the means 26 to a [NP L3] and [NP [L2]] format of the uniform network communication protocol and thereafter to the [NP L1] format for use during transmission across the communication digital switching network 12.

Upon arrival at the destination subsystem 14 the data is delivered to the addressed peripheral 24 according to a reversal of the above-described path with the requisite communication protocol conversion being executed immediately prior to exiting the addressed peripheral interface device 20.

Figure 6:
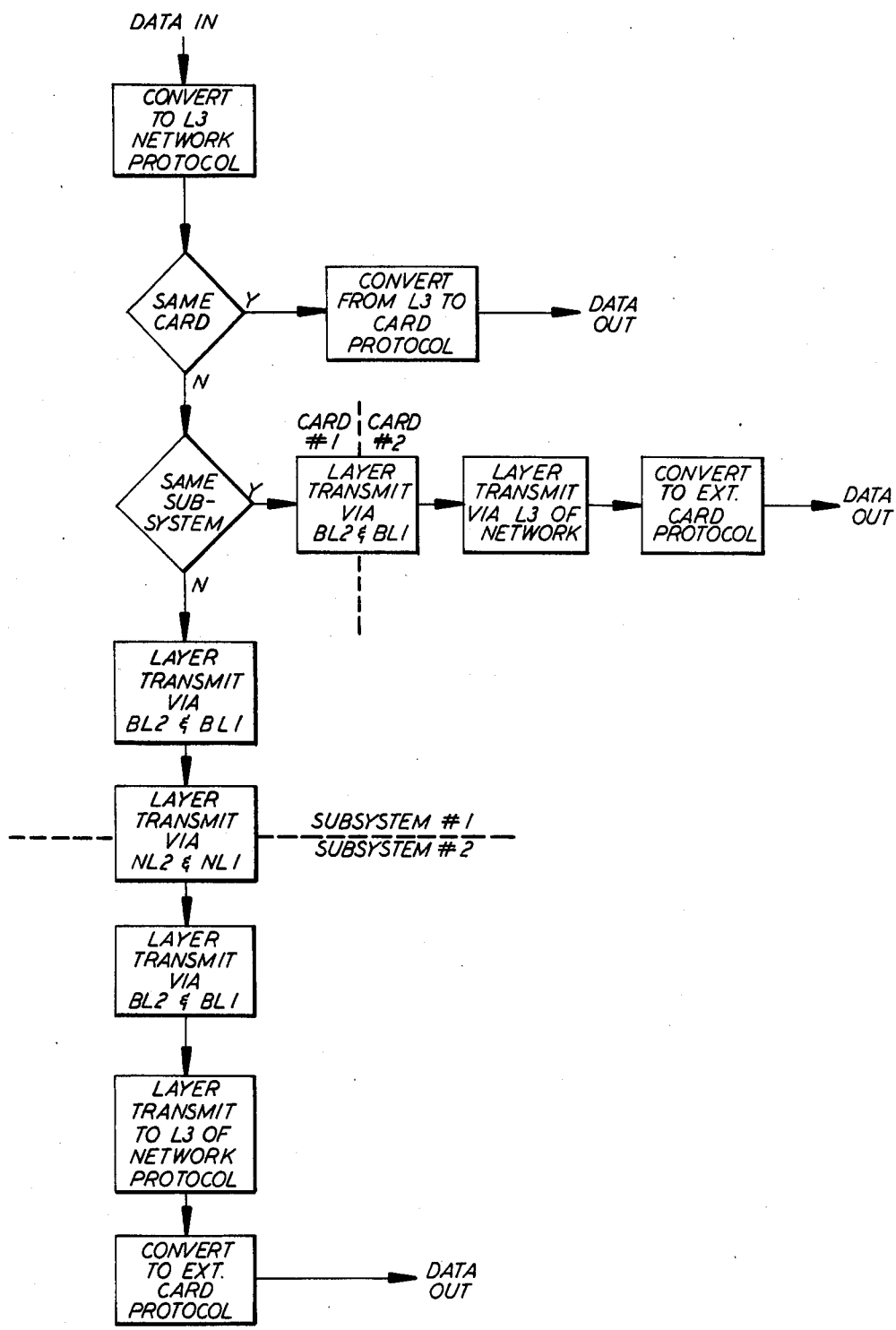
FIG. 6 is a flow diagram of a method for executing communication protocol conversions according to the present invention.

The preferred method for the network wide communication protocol conversion is shown as a flow diagram in FIG. 6. As shown, immediately upon ingress into the apparatus 10, all data is converted to the uniform network protocol. Based on the information in the format of the uniform network protocol, a decision is made to either envelope the format from the Level 3 to the intrasubsystem formats BL2 and BL1 for transfer from the peripheral interface device 20 or, if the transfer is local, to return the data to the peripheral interface device 20. Hence, data addressed to a peripheral 24 interconnected to the same peripheral interface device 20, is simply reconverted to the same external communication protocol and outputted to the addressed peripheral 24. The flow diagram shown in FIG. 6 presumes that only a single peripheral interface device 20 is provided within the subsystem 14 for each particular external communication protocol.

The address is also queried to ascertain whether or not the addressed peripheral 24 is interconnected with the same subsystem 14 as the forwarding peripheral 24. If so, the data is passed to the means 26, after Level 3 processing and intranodal level processing, BL2 and BL1, for transfer from the sending peripheral interface device 20 to the receiving peripheral interface device 20 within the same subsystem 14. Upon entering the destination peripheral interface device 20, within the same subsystem 14, the enveloped data has layers removed to Level 3 of the uniform network protocol and subsequently converted to the external protocol of the recipient peripheral 24.

In the event that the data is to be transmitted to a different subsystem 14, the peripheral interface device 20 transports the Level 3 formatted packet to the network interface device 18 of its subsystem 14, via formats, BL2 and BL1. The network interface device 18 then extracts the Level 3 packet, after BL2 and BL1 processing, for subsequent delivery to the virtual link protocol [NP L2], whereupon the data is transferred to the physical medium [NPL1] of the digital switching network 12.

Upon arrival at the destination subsystem 14, the data is immediately processed to the [NP L2] of the uniform network protocol, via means 31 of a network interface device 18 and directed to a specific peripheral interface device 20, according to formats [BL2] and [BL1]. Therein, the data is processed by Layer 3 of the uniform network protocol and subsequently transported according to the communication protocol of the external device [EP [B]].

Although the present invention has been described herein, with regard to an exemplary embodiment, it is understood that other configurations or arrangements may be developed which nevertheless do not depart from the spirit and scope of the present invention. Consequently, the present invention is deemed limited only by the attached claims and the reasonable interpretation thereof.

What is claimed is:

1. An apparatus for use in data communications; said apparatus comprising:
    a plurality of peripheral interface devices, each said device including means for executing only a single communication protocol conversion between a preselected external communication protocol and a uniform communication protocol;
    means, associated with each said peripheral interface device, for establishing a communication link with a plurality of peripherals, said plurality of peripherals operating according to said preselected external communication protocol of said associated peripheral interface device
    means for establishing a data communication path between and among said devices, said data commuciations being made along said path according to said uniform communication protocol; and
    a plurality of network interface devices, said network interface devices having means for establishing a data communication link to a data communication network according to said uniform communication protocol, said plurality of network interface devices also being interconnected with said communication path establishing means whereby all said network interface devices can communicate with all said peripheral interface devices and among each other.

2. Apparatus as claimed in claim 1 wherein said communication path establishing means includes a masterless multiple access collision detection bus.

3. Apparatus as claimed in claim 2 wherein said communication establishing means further includes a data transmission bus, said data transmission bus being distinct from said collision detection bus.

4. Apparatus as claimed in claim 1; further comprising:
    means, associated with each said peripheral interface device, for controlling all data traffic flow through said device.

5. Apparatus as claimed in claim 4 wherein said communication protocol conversion means and said traffic flow control means are provided by a single microcomputer.

6. Apparatus as claimed in claim 1 further comprising:
    means, associated with each said network interface device, for controlling all data traffic flow thereacross, said means for controlling all traffic flow across said network interface device being identical throughout said apparatus.

7. Apparatus as claimed in claim 1 further comprising:
    means for accepting an additional peripheral interface device having a communication protocol conversion execution means adapted to execute a communication protocol conversion between a previously unavailable external communication protocol and said uniform communication protocol.

8. Apparatus as claimed in claim 7 further comprising:
    means for accepting an additional network interface device.

9. Apparatus as claimed in claim 1 further comprising:
    means for accepting an additional peripheral interface device having a communication protocol conversion execution means adapted to execute a communication protocol different preselected conversion between a external communication protocol and said uniform communication protocol.

10. A data communication network comprising:
    a plurality of subsystems interconnected via a networking medium, each said subsystem independently controlling all data traffic flow therethrough, each said subsystem including a plurality of peripheral interface devices, each said device being dedicated to execute only a single communication protocol between a preselected external communication protocol and a uniform communication protocol which said preselected external communication protocol can be selected in only a single one of said subsystem without affecting any other said subsystem;
    means, associated with each said peripheral interface device in said network, for establishing a data communication path between and among all said peripheral interface devices within each said subsystem; and
    means, associated with each subsystem and identical throughout said network, for controlling all data traffic flow between said plurality of peripheral interface devices thereof and said network according to said uniform communication protocol.

11. Network as claimed in claim 10 further comprising:
    means, associated with each subsystem, for accepting additional said peripheral interface devices therewithin; and
    means, associated with each subsystem, for modularly increasing the number of data traffic control means between said peripheral interface devices and said network.

12. Network as claimed in claim 10 wherein said networking medium is dedicated to providing data path set-up and tear-down without directly manipulating the data to be transferred between said subsystems.

13. Network as claimed in claim 10, further comprising:
    means, associated with one of said subsystems for executing extended protocol conversions for said network.

14. A subsystem for providing data communication services between a plurality of peripherals operating according to different communication protocols; said subsystem comprising;
    a plurality of peripheral interface devices each being adapted to execute only a single communication protocol conversion between one of said different communication protocols to a communication protocol uniform to all said peripheral interface devices;

means for interconnecting all of said peripheral interface devices, said interconnection means includes a masterless multiple access collision detection bus, and a data transmission bus, said collision detection bus being distinct from said data transmission bus; and means, associated with each said peripheral interface devices, for controlling all data traffic flow thereamong according to said uniform communication protocol.

15. Subsystem as claimed in claim 14 wherein each said peripheral interface device and said data traffic flow control means associated therewith are on a single printed circuit board.

16. Subsystem as claimed in claim 15 further comprising:

a master printed circuit board having said interconnection means formed thereon; and a plurality of printed circuit board connectors, each said connector accepting one said peripheral interface device printed circuit board and being connected to said interconnection means.

17. A method of executing communication protocol conversions within a communication network; said method comprises the steps of:

providing each subsystem of said network with a plurality of peripheral interface devices, each said device being provided with a means for executing only a single communication protocol conversion between a preselected one of a number of different external communication protocols and a uniform communication protocol;

interconnecting said peripheral interface devices within each subsystem thereby establishing data communication thereamong according to said uniform communication protocol;

establishing a communication link between each said peripheral interface device and a plurality of peripherals such that only peripherals operating according to said preselected one of said different communication protocols are interconnected with that said peripheral interface device having the same external communication protocol conversion means associated therewith;

providing, on each said peripheral interface device, means for controlling all data traffic flow therethrough; and providing each said subsystem with at least one network interface device for controlling all data traffic flow between said peripheral interface devices and said communication network according to said uniform communication protocol.

18. Method as claimed in claim 17 further comprises the step of:

interconnecting all said network interface devices of each said subsystem with all said peripheral interface devices of the same subsystem.

19. Method as claimed in claim 18 further comprises the step of:

providing each said subsystem with a means for accepting additional peripheral interface devices.

20. Method as claimed in claim 18 further comprises the step of:

providing each said subsystem with means for accepting additional network interface devices substantially identical to every other said network interface device.

* * * * *